(12) United States Patent
Bean et al.

(10) Patent No.: US 11,075,902 B1
(45) Date of Patent: Jul. 27, 2021

(54) SYSTEMS AND METHODS OF HARDENED PROXY AUTHENTICATION

(71) Applicant: Rockwell Collins, Inc., Cedar Rapids, IA (US)

(72) Inventors: Reginald D. Bean, Center Point, IA (US); Gregory W. Rice, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 198 days.

(21) Appl. No.: 16/189,820

(22) Filed: Nov. 13, 2018

(51) Int. Cl.
| | |
|---|---|
| G06F 21/00 | (2013.01) |
| H04L 29/06 | (2006.01) |
| H04L 9/32 | (2006.01) |
| H04L 9/08 | (2006.01) |
| G06F 9/455 | (2018.01) |

(52) U.S. Cl.
CPC ...... H04L 63/0853 (2013.01); G06F 9/45558 (2013.01); H04L 9/0861 (2013.01); H04L 9/3213 (2013.01); H04L 9/3234 (2013.01); H04L 63/0876 (2013.01); H04L 63/10 (2013.01); *G06F 2009/45587* (2013.01)

(58) Field of Classification Search
CPC .............. H04L 63/0853; H04L 9/0861; G06F 9/45558
See application file for complete search history.

(56) References Cited

U.S. PATENT DOCUMENTS

| | | | | |
|---|---|---|---|---|
| 2012/0079101 | A1* | 3/2012 | Muppala | H04L 63/1425 709/224 |
| 2015/0088982 | A1* | 3/2015 | Johnson | H04L 67/1004 709/203 |
| 2017/0171200 | A1* | 6/2017 | Bao | H04L 9/3213 |
| 2018/0292892 | A1* | 10/2018 | Pececnik | G07F 17/3272 |
| 2018/0343238 | A1* | 11/2018 | Tola | H04L 9/3263 |

\* cited by examiner

*Primary Examiner* — Jeffrey C Pwu
*Assistant Examiner* — Rodman Alexander Mahmoudi
(74) *Attorney, Agent, or Firm* — Suiter Swantz pc llo (57) ABSTRACT

A network authorization system includes an authorization interface, an authorizer, and a network interface. The authorization interface receives a network connection request to access an external network and generates a characteristic of a portable component. The authorizer compares the characteristic to a predetermined characteristic, generates an authorization token responsive to the characteristic matching the predetermined characteristic, uses the authorization token to authenticate the network connection request, and transmits a first notification to the authorization interface that the characteristic matched the predetermined characteristic. The network interface receives, from the authorizer, a second notification indicating that the authorizer authenticated the network connection request, and transmits the network connection request to the external network responsive to determining, based on the network connection request and the second notification, that the network connection request is authorized for external transmission.

19 Claims, 5 Drawing Sheets

SYSTEMS AND METHODS OF HARDENED PROXY AUTHENTICATION

BACKGROUND

The present disclosure relates generally to the field of avionics systems. More particularly, the present disclosure relates to systems and methods of hardened proxy authentication.

Open systems architectures can be used for military platforms, such as to enable standardized software development and integration across various platforms. Open systems architectures can include the Future Airborne Capability Environment (FACE) and the Open Missions Systems (OMS) architectures. However, open systems frequently host untrusted and third party applications; consequently, these systems can be vulnerable to exploits and other security violations, including exfiltration of sensitive data maintained within the systems.

SUMMARY

In one aspect, the inventive concepts disclosed herein are directed to a network authorization system. The network authorization system includes an authorization interface, an authorizer, and a network interface. The authorization interface is configured to receive, from a portable component, a network connection request to access an external network; and generate a characteristic of the portable component. The authorizer is coupled to the authorization interface and configured to receive the network connection request and the characteristic from the authorization interface; compare the characteristic to a predetermined characteristic corresponding to the portable component; generate an authorization token responsive to the characteristic matching the predetermined characteristic based on the comparison; use the authorization token to authenticate the network connection request; and transmit a first notification to the authorization interface indicating that the characteristic matched the predetermined characteristic. The network interface is coupled to the authorization interface, the authorizer, and the external network. The network interface is configured to receive, from the authorization interface, the network connection request, the authorization interface transmitting the network connection request to the network interface responsive to receiving the first notification; receive, from the authorizer, a second notification indicating that the authorizer authenticated the network connection request; and transmit the network connection request to the external network responsive to determining, based on the network connection request and the second notification, that the network connection request is authorized for external transmission.

In a further aspect, the inventive concepts disclosed herein are directed to an airborne platform. The airborne platform includes a communications circuit, a user interface, and an avionics system. The communications circuit is configured to communicate with an external network. The user interface includes a display device and a user input device. The avionics system includes an authorization interface, an authorizer, and a network interface. The authorization interface is configured to receive, from a portable component, a network connection request to access the external network; and generate a characteristic of the portable component. The authorizer is coupled to the authorization interface, and configured to receive the network connection request and the characteristic from the authorization interface; compare the characteristic to a predetermined characteristic corresponding to the portable component; generate an authorization token responsive to the characteristic matching the predetermined characteristic based on the comparison; use the authorization token to authenticate the network connection request; and transmit a first notification to the authorization interface indicating that the characteristic matched the predetermined characteristic. The network interface is a network interface coupled to the authorization interface, the authorizer, and the external network, and configured to receive, from the authorization interface, the network connection request, the authorization interface transmitting the network connection request to the network interface responsive to receiving the first notification; receive, from the authorizer, a second notification indicating that the authorizer authenticated the network connection request; and transmit the network connection request to the external network responsive to determining, based on the network connection request and the second notification, that the network connection request is authorized for external transmission.

In a further aspect, the inventive concepts disclosed herein are directed to a method. The method includes receiving, by an authorization interface from a portable component, a network connection request to access an external network; generating, by the authorization interface, a characteristic of the portable component; receiving, by an authorizer, the network connection request and the characteristic from the authorization interface; comparing, by the authorizer, the characteristic to a predetermined characteristic corresponding to the portable component; generating, by the authorizer, an authorization token responsive to the characteristic matching the predetermined characteristic based on the comparison; authenticating, by the authorizer, the network connection request using the authorization token; transmitting, by the authorizer, a first notification to the authorization interface indicating that the characteristic matched the predetermined characteristic; receiving, by a network interface from the authorization interface, the network connection request, the authorization interface transmitting the network connection request to the network interface responsive to receiving the first notification; receiving, by the network interface from the authorizer, a second notification indicating that the authorizer authenticated the network connection request; and transmitting, by the network interface, the network connection request to the external network responsive to determining, based on the network connection request and the second notification, that the network connection request is authorized for external transmission.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to systems and methods of hardened proxy authentication, including in Future Airborne Capability Environment (FACE) and Open Missions Systems (OMS) architectures. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment in which a platform may be expected to perform an autonomous maneuver, the effectiveness of which may depend on an energy state of the platform (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a network authorization system includes an authorization interface, an authorizer, and a network interface. The authorization interface is configured to receive, from a portable component, a network connection request to access an external network; and generate a characteristic of the portable component. The authorizer is coupled to the authorization interface and configured to receive the network connection request and the characteristic from the authorization interface; compare the characteristic to a predetermined characteristic corresponding to the portable component; generate an authorization token responsive to the characteristic matching the predetermined characteristic based on the comparison; use the authorization token to authenticate the network connection request; and transmit a first notification to the authorization interface indicating that the characteristic matched the predetermined characteristic. The network interface is coupled to the authorization interface, the authorizer, and the external network. The network interface is configured to receive, from the authorization interface, the network connection request, the authorization interface transmitting the network connection request to the network interface responsive to receiving the first notification; receive, from the authorizer, a second notification indicating that the authorizer authenticated the network connection request; and transmit the network connection request to the external network responsive to determining, based on the network connection request and the second notification, that the network connection request is authorized for external transmission. Open systems architectures, such as FACE, can allow third party applications to be interoperable through a transport layer that provides application interconnectivity, access to system services, and access to external networks, and can be used for mission critical systems. However, if a third party application is compromised, it could extract sensitive information from other applications and exfiltrate the sensitive information to third parties via the external networks. For example, despite being well-tested, third party applications may be injected with malicious software components or misconfigured, which can compromise the security of the open system architecture, and even allow undesired command and control of the system. As such, third party applications operating in FACE and OMS architectures may be considered untrusted without any deep inspect of design details, which can be significantly resource-intensive.

Systems and methods in accordance with the inventive concepts disclosed herein can enable open systems architectures to more securely execute third party applications by using the authorization interface, authorizer, and network interface—which can be provably isolated from one another—to automatically inspect applications and network communication requests, and isolate compromised third party applications. The authorization interface, authorizer, and network interface, which are used to execute the exfiltration detection, prevention, and inhibiting, can be trusted. For example, the authorization interface can inspect the application, the authorizer can confirm whether the application has proper integrity, and the network interface can isolate the application if the application does not have proper integrity—functions which can be independently and isolatedly performed. As such, the system can prevent compromised applications, such as applications compromised by malware, that attempt to exfiltrate data from the system, from connecting to the external network, without prior knowledge of the malware.

For example, applications can be inspected to ensure that they are operating in a known, good form. The authorizer can be hardened against cyber attacks. The present solution can block all unauthorized network communication requests with minimal client delay and network overhead (including zero-day attacks). The present solution can be transparent to the FACE architecture, and can be retrofit into the FACE architecture (e.g., if there is a need for data egress controls for the FACE architecture). The present solution can eliminate backdoor control channels, exfiltration of sensitive data, and the spread of infection.

As compared to typical whitelisting mechanisms, systems and methods in accordance with the inventive concepts disclosed herein can execute whitelisting via network gates (e.g., the network interface). For example, existing systems typically whitelist applications at the processing node; for example, an application that does not operate in a known, good state will be prevented from execution. However, in a safety critical environment, it can be undesirable to completely prevent application execution. The present solution may whitelist using the network interface, rather than whitelisting the application itself, by inspecting applications when they attempt to communicate with a third party outside the platform via an external network, and then denying the application external connectivity if the inspection returns a misconfiguration.

Figure 1A:
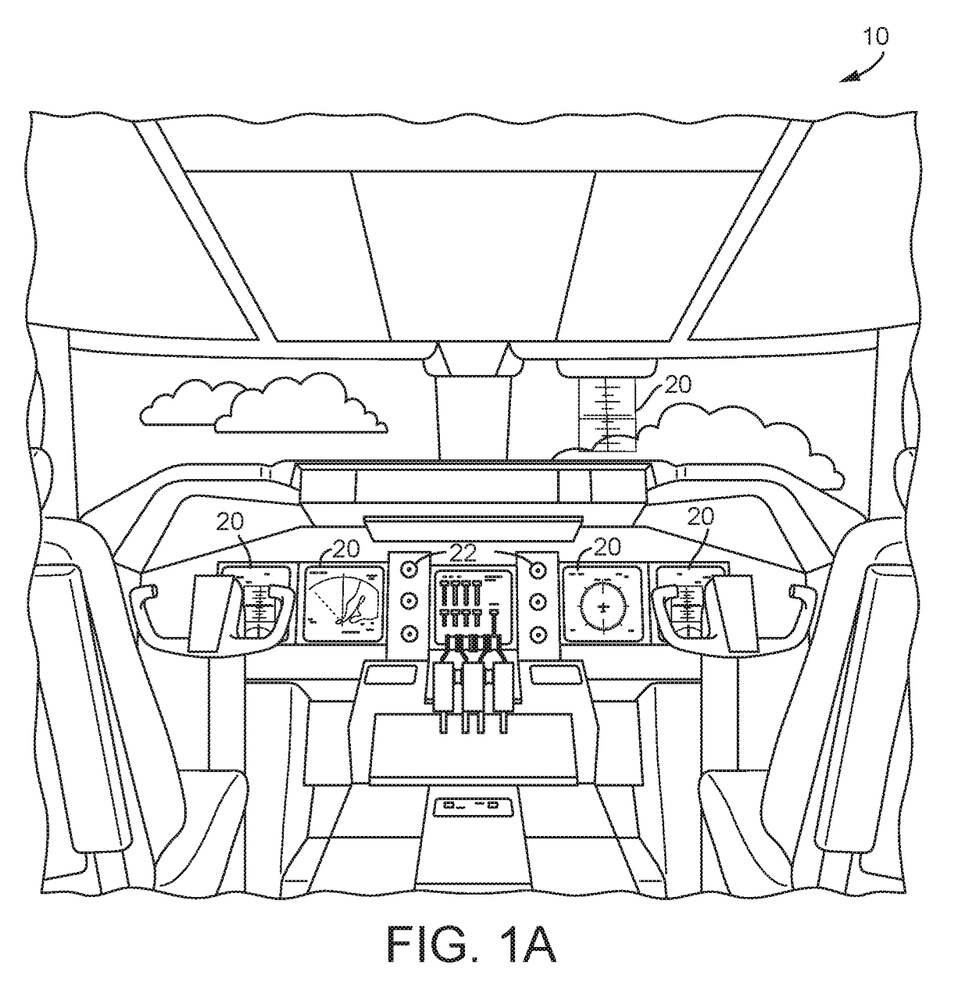
FIG. 1A is a schematic diagram of an exemplary embodiment of an aircraft control center according to the inventive concepts disclosed herein.

Referring to FIG. 1A, a perspective view schematic illustration of an aircraft flight deck or cockpit 10 is shown accordingly to an exemplary embodiment of the inventive concepts disclosed herein. The aircraft flight deck 10 can be configured for an aircraft operator or other user to interact with avionics systems of an airborne platform. The aircraft flight deck 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. UI elements 22, such as indicator lights, displays, display elements, and audio alerting devices.

Figure 1B:
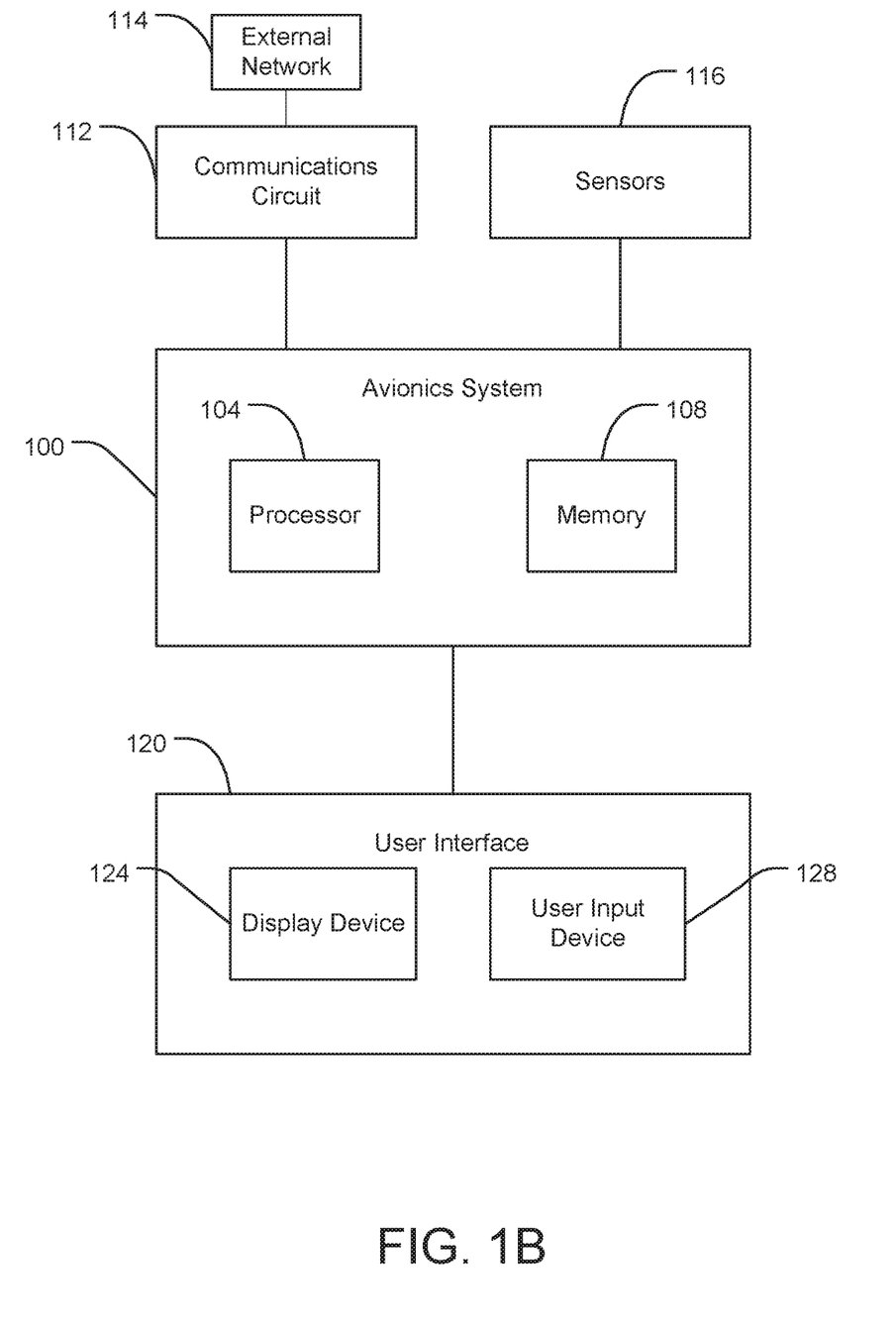
FIG. 1B is a block diagram of an exemplary embodiment of electronics systems of an airborne platform according to the inventive concepts disclosed herein.

Referring now to FIG. 1B, an avionics system 100 according to an exemplary embodiment of the inventive concepts disclosed herein can communicate with a communications circuit 112, one or more sensors 116, and a user interface 120. The avionics system 100 can be implemented on an airborne platform or other platform described herein. The avionics system 100 includes a processor 104 and memory 108. The processor 104 may be implemented as a specific purpose processor, an application specific integrated circuit (ASIC), one or more field programmable gate arrays (FPGAs), a group of processing components, or other suitable electronic processing components. The memory 108 is one or more devices (e.g., RAM, ROM, flash memory, hard disk storage) for storing data and computer code for completing and facilitating the various user or client processes, layers, and modules described in the present disclosure. The memory 108 may be or include volatile memory or non-volatile memory and may include database components, object code components, script components, or any other type of information structure for supporting the various activities and information structures of the inventive concepts disclosed herein. The memory 108 is communicably connected to the processor 104 and includes computer code or instruction modules for executing one or more processes described herein. The memory 108 includes various circuits, software engines, and/or modules that cause the processor 104 to execute the systems and methods described herein. The avionics system 100 can implement an open systems architecture, such as a FACE or OMS architecture. The memory 108 can include third party applications that the processor 104 executes using the open systems architecture, including to communicate between the third applications and the communications circuit 112, sensors 116, and user interface 120.

The communications circuit 112 can include receiver electronics and transmitter electronics. The communications circuit 112 can include a radio configured for radio frequency communication. The communications circuit 112 can include a datalink radio. The communications circuit 112 can enable the avionics system 100 to communicate with an external network 114. The communications circuit 112 can include Ethernet communication hardware.

The one or more sensors 116 can detect, generate, and output sensor data regarding the platform and an environment about the platform, including altitude and energy state variables, such as speed (e.g., vertical speed) and acceleration (e.g., vertical acceleration). The one or more sensors 116 can include various sensors, including but not limited to an inertial measurement unit (which may include one or more gyroscopes and one or more accelerometers, such as three gyroscopes and three accelerometers), an air data sensor (e.g., sensor(s) configured to detect and output an indication of static pressure), a magnetic compass, a navigation system, a vision system (e.g., a camera, an infrared image sensor, a LIDAR), a global navigation satellite system (GNSS), a weather radar system (e.g., a weather radar configured to output Doppler measurements), an altimeter, a true airspeed sensor, or an indicated airspeed sensor.

The user interface 120 includes a display device 124 and a user input device 128. The display device 124 can incorporate features of the flight displays 20 described with reference to FIG. 1A. The display device 124 can present display data generated by applications executed by the avionics system 100. The user interface 120 can include an audio output device. The user input device 128 can incorporate features of the UI elements 22 described with reference to FIG. 1A. The user interface 120 can receive commands for controlling operation of applications executed by the avionics system 100.

Figure 2:
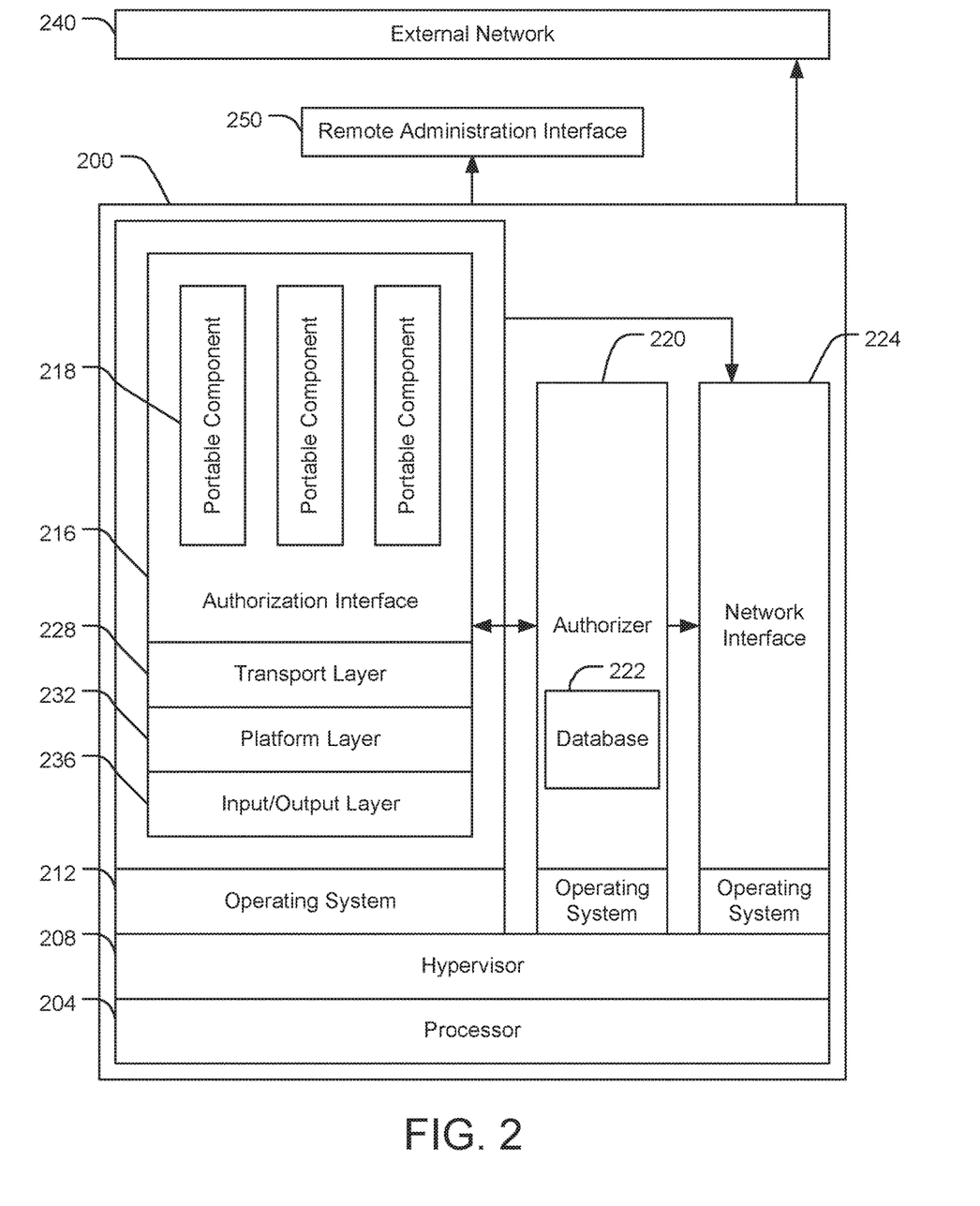
FIG. 2 is a schematic diagram of an embodiment of a network authentication system that can execute hardened proxy authentication according to the inventive concepts disclosed herein.
Figure 3:
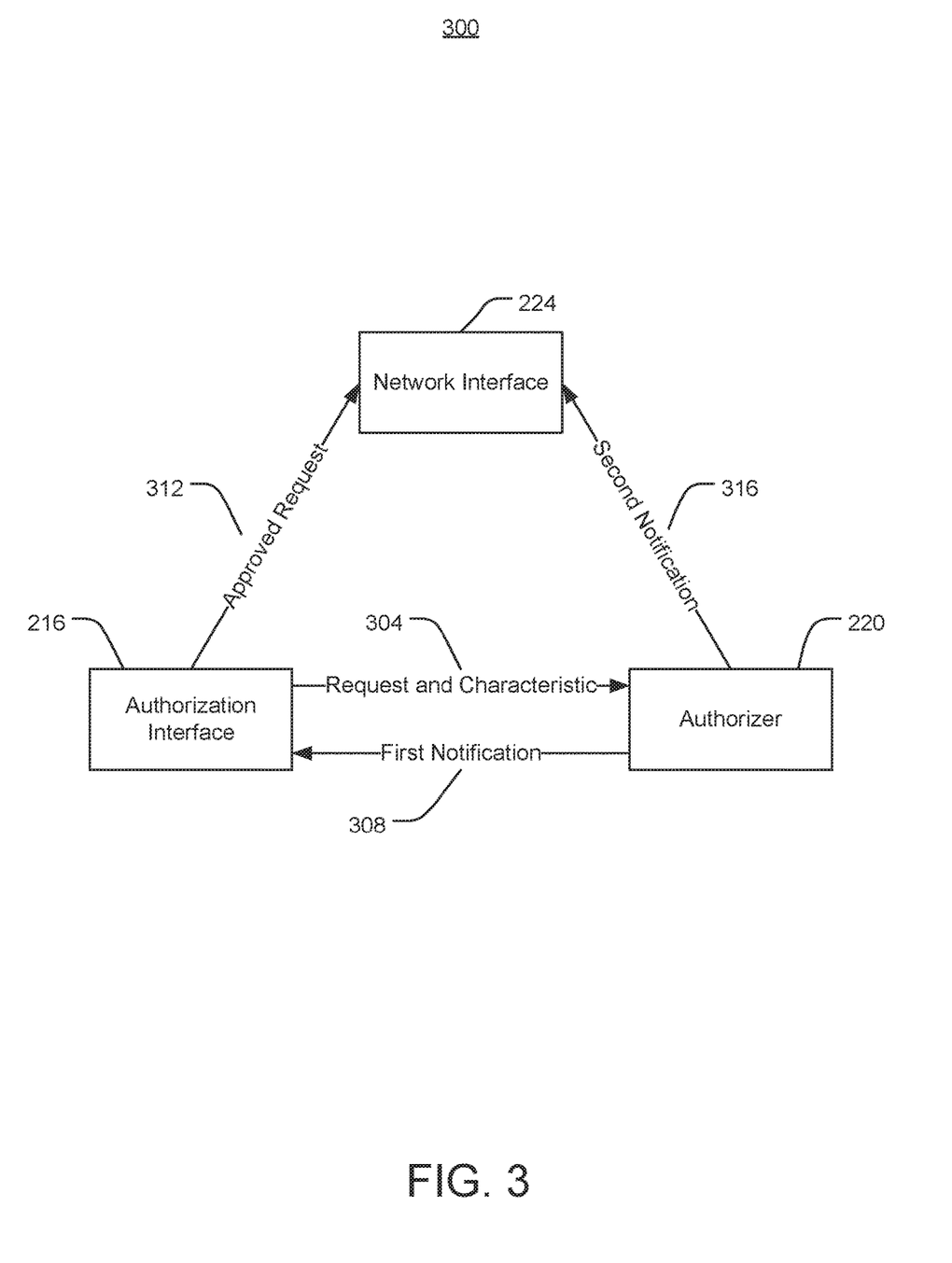
FIG. 3 is a schematic diagram of communication flows executed by the system of FIG. 2.

Referring now to FIGS. 2-3, a system 200 according to an exemplary embodiment of the inventive concepts disclosed herein includes a processor 204 that executes an operating system 212, and can execute the communication flow 300 depicted in FIG. 3. The system 200 can be used to implement an open systems architecture, such as FACE and/or OMS, including for mission critical systems. The system 200 can be implemented using the avionics system 100 of FIG. 1B. The processor 204 can incorporate features of the processor 104 described with reference to FIG. 1B, including to execute applications and other components of memory 108. The processor 204 can execute a plurality of operating systems 212 and other components of the system 200.

The system 200 includes an authorization interface 216, an authorizer 220 (e.g., an authorization service), and a network interface 224 (e.g., a network proxy service). As shown in FIG. 2, the system 200 can execute independent operating systems 212 corresponding to each of the authorization interface 216, the authorizer 220, and the network interface 224.

The authorization interface 216 receives network communication requests from one or more portable components 218 (e.g., portable avionics components). Each portable component 218 can be a third party application (e.g., an executable data structure maintained in memory 108). In some embodiments, the portable component 218 executes a cryptographic service. In some embodiments, the portable component 218 includes a logical interface control for data input, data output, control input, and status output, each of which can have an executable method for data inhibiting. The portable component 218 can receive sensor data (e.g., from the one or more sensors 116 described with reference to FIG. 1B) and generate display data and/or a network communication request based on the sensor data.

The system 200 can include a transport layer 228, such as a transport services segment. The transport layer 228 can perform communication through message-based transport applications. The system 200 can include a platform layer 232, such as a platform-specific services segment. The system 200 can include an input/output (I/O) layer 236, such as an I/O services segment, which can provide indirect hardware access.

The network connection request received by the authorization interface 216 can include a request to access an external network 240, such as to transmit data from one or more of the portable components 218 to a third party entity via the external network 240. The authorization interface 216 can be similar to a local host proxy, and can be essentially invisible to the portable components 218, in order to intercept all attempts by the portable components 218 to communicate with the external network 240 before they are transmitted. The authorization interface 216 can expose an interface (e.g., expose functions) to the portable components 218 that are similar to or identical to functions exposed by the transport layer 228 for receiving network connection requests from the portable components 218.

The authorization interface 216 can receive and/or generate a characteristic of the portable component 218 from which the network connection request was received. The characteristic can include a hash of an executable file of the portable component 218. The characteristic can also include a hash of one or more libraries associated with the portable component 218 (e.g., libraries on disk). The authorization interface 216 can execute the hashes of the executable and/or the libraries. In some embodiments, the authorization interface 216 generates the characteristic responsive to receiving the network communication request. In some embodiments, the authorization interface 216 generates the characteristic responsive to a trigger event, such as receiving an indication of the portable component 218 requesting access to at least one of a new portable component 218, port, or interface that the portable component 218 requesting access does not have access to (e.g., the authorization interface 216 can maintain a table associating, to each portable component 218, each other portable component 218, port, and/or interface that the portable component 218 has access to, and determine whether the portable component 218 requesting access has access using the table).

In some embodiments, the authorization interface 216 generates the characteristic of the portable component 218 at load time by hashing a non-volatile image of the portable component 218. For example, the authorization interface 216 can hash a static image of the portable component 218 on hard disk storage. In some embodiments, the authorization interface 216 generates the characteristic of the portable component 218 at run time by hashing a volatile image and/or instance of the portable component 218 in a dynamic memory space, which can be useful as a compromised portable component 218 can affect the data stored in memory at run-time.

The authorizer 220 can receive the network connection request and the characteristic of the portable component from the authorization interface 216 as a request and characteristic transmission 304. The authorizer 220 maintains a database 220 mapping, to each portable component 218, at least one predetermined characteristic. For example, the database 222 can include, for each portable component 218, a known hash of the portable component 218 (e.g., a known and/or trusted result of executing a cryptographic hashing function to generate the hash of the portable component 218). The known hash may be received by the database 222 from a trusted source, such as an independent authorization service. The database 222 can include a known hash of each library associated with each corresponding portable component 218. The database 222 can be a whitelist database.

The authorizer 220 can execute integrity analysis on the request and characteristic transmission 304 using the database 222. The authorizer 220 can extract the characteristic of the portable component 218 from the request and characteristic transmission 304, identify a predetermined characteristic corresponding to the portable component 218 (e.g., based on an identifier of the portable component 218 received from the authorization interface 216), and compare the extracted characteristic to the predetermined characteristic. The authorizer 220 can determine whether the extracted characteristic matches the predetermined characteristic based on the comparison (e.g., the result of executing a cryptographic hashing function to hash the portable component 218 is equal to the known hash).

Responsive to the extracted characteristic matching the predetermined characteristic, the authorizer 220 can indicate the network connection request to be authorized. For example, the authorizer 220 can generate an authorization token responsive to the extracted characteristic matching the predetermined characteristic. The authorizer 220 can use the authorization token to authenticate the network connection request, such as by cryptographically signing the network connection request.

The authorizer 220 can transmit a first notification 308 to the authorization interface 216 to indicate that the extracted characteristic matched the predetermined characteristic. As such, the authorizer 220 can inform the authorization interface 216 that the network connection request is authorized for external transmission. In response to receiving the first notification 308, the authorization interface 216 can transmit an approved request 312 (e.g., the network connection request, now having been authorized) to the network interface 224.

The authorizer 220 can transmit a second notification 316 to the network interface 224 to indicate that the authorizer 220 authenticated the network connection request for transmission to the external network 240. As such, the system 200 can enable the network interface 224 to independently receive the approved request 312 (from the authorization interface 216) and the second notification 316 (from the authorizer 220), which can improve the reliability of the system 200 with respect to securely preventing compromised portable components 318 from exfiltrating sensitive data.

The network interface 224 can maintain an authorization database that assigns, to each of the portable components 218, an indication of whether the second notification 316 has been received for the corresponding portable component 218 to indicate that the network connection request originating from the portable component 218 is approved for transmission via the external network 240. In some embodiments, the network interface 224 can set each indication to an authorized state or a non-authorized state. In some embodiments, the network interface 224 assigns the indication to each network connection request, such that the network interface 224 can independently determine whether to transmit various network connection requests originating from the same portable component 218. In some embodiments, the network interface 224 assigns the indication to each portable component 218, and can initiate a timer responsive to setting the indication to the authorized state (e.g., responsive to receiving the second notification corresponding to the network connection request originated by the portable component 218), periodically increment the timer, compare the timer to a threshold time, and set the indication to the non-authorized state responsive to the timer meeting or exceeding the threshold time.

In response to receiving the approved request 312 from the authorization interface 316, the network interface 224 can determine whether to transmit the approved request 312 to the external network 240 (e.g., using communications circuit 112). For example, the network interface 224 can extract an identifier of the approved request 312 from the approved request 312 (e.g., an identifier corresponding to the approved request 312; an identifier corresponding to the portable component 218 that generated the approved request 312), and use the extracted identifier to search the authorization database to retrieve the indication corresponding to the approved request 312 and/or the portable component 218 that originated the approved request 312. The network interface 224 can use the retrieved indication to determine whether to transmit the approved request 312. For example, responsive to determining the retrieved indication to be set to the authorized state, the network interface 224 can transmit the approved request 312 via the external network 240.

Responsive to determining the retrieved indication to be set to the non-authorized state, the network interface 224 can take actions associated with isolating the portable component 218 that attempted to transmit an unauthorized request. For example, the network interface 224 can not transmit the network connection request if the indication is set to the non-authorized state, which can enable whitelisting at the network port represented by the network interface 224.

In some embodiments, the network interface 224 can disable the portable component 218 that originated the non-authorized network connection request. The network interface 224 may maintain a count indicating a number of instances in which the portable component 218 originated non-authorized network connection requests, compare the count to a threshold count, and disable the portable component 218 responsive to the count exceeding the threshold count. As such, the network interface 224 may take a relatively low overhead approach by performing whitelisting at the network port, unless the network interface 224 determines that the compromise of the portable component 218 is significant enough to disable the portable component 218 itself.

The system 200 can isolate the authorization interface 216, authorizer 220, and network interface 224. As described further herein, the authorizer 220 can act as a hardened component that can authenticate and/or authorize network communication requests based on trusted integrity information; by isolating the authorization interface 216, authorizer 220, and network interface 224, the system 200 can protect the authorizer 220, which performs these functions, from being compromised.

For example, the system 200 can include a hypervisor 208 that isolates the authorization interface 216, the authorizer 220, and the network interface 224. The hypervisor 208 can execute each of the authorization interface 216, the authorizer 220, and the network interface 224 using separate virtual machines/instances. The system 200 can execute the authorization interface 216, the authorizer 220, and/or the network interface 224 on different cores of a multicore processing system (or, similarly, on different computers) to enable isolation. As shown in FIG. 2, the hypervisor 208 can independently (e.g., in isolation) execute operating systems 212 corresponding to each of the authorization interface 216, the authorizer 220, and the network interface 224.

In some embodiments, the system 200 includes a remote administration interface 250. The remote administration interface 250 can output status information regarding the system 200, including regarding operation of the authorization interface 216, authorizer 220, and/or network interface 224. In some embodiments, the remote administration interface 250 outputs status information including at least one of a recent application query, a connected client (e.g., a third party entity that receives network communications from portable components 218), or a usage detail. The remote administration interface 250 can maintain a count of each time a particular portable component 218 had a network connection request allowed or denied, and output the count for each portable component 218. As such, the remote administration interface 250 can enable performance of the system 200 in preventing successful exploits to be monitored.

Figure 4:
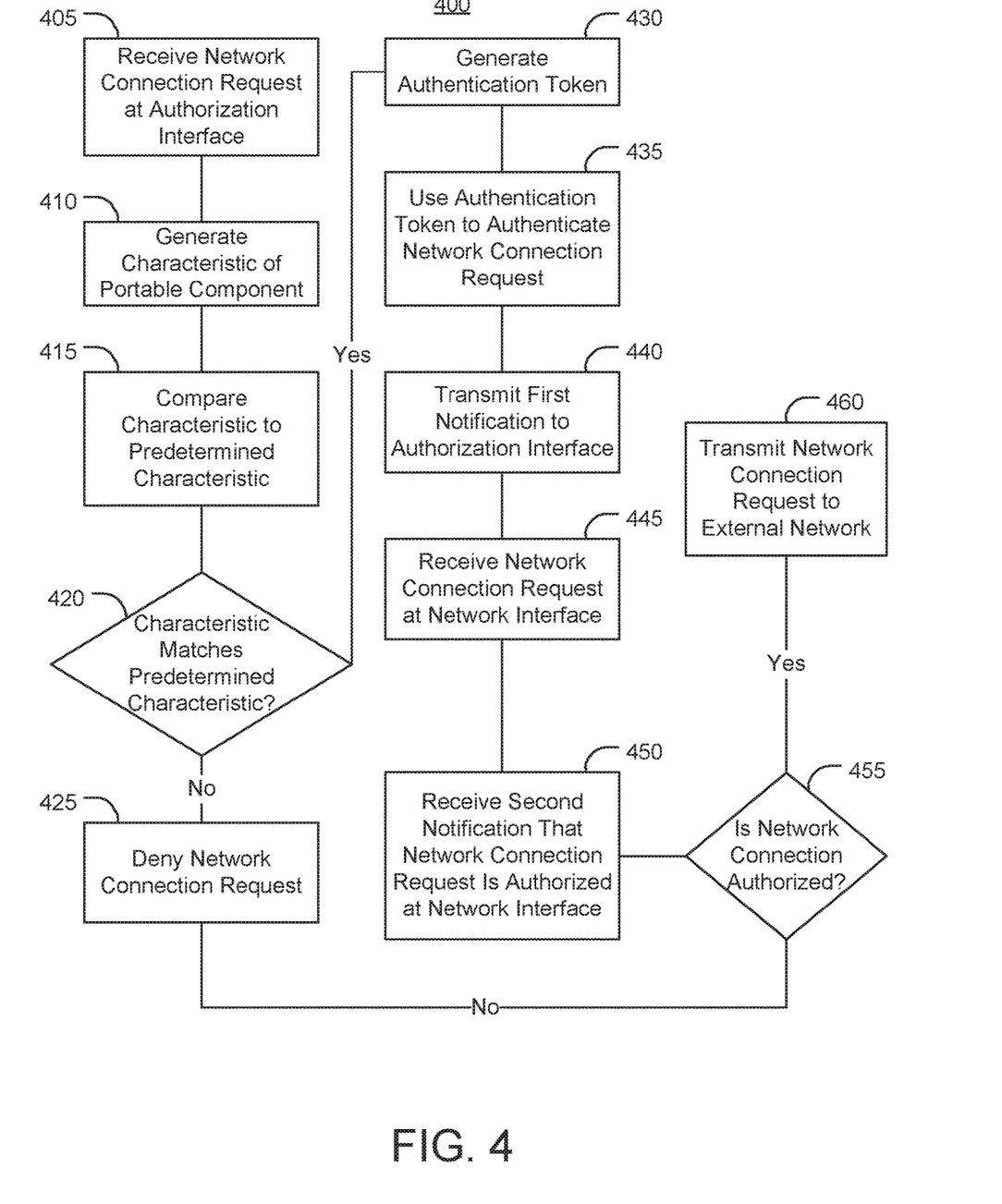
FIG. 4 is a flow diagram of an exemplary embodiment of a method of performing hardened proxy authentication according to the inventive concepts disclosed herein.

Referring now to FIG. 4, a method 400 of operating a hardened proxy authentication system according to an exemplary embodiment of the inventive concepts disclosed herein may include one or more of the following steps. The method 400 can be executed using various systems described herein, including the system 200.

A step (405) may include receiving, by an authorization interface from a portable component, a network connection request to access an external network. The portable component can be executed by a processor of an open systems architecture, such as the FACE or OMS architectures. The authorization interface can be similar to a local host proxy, and can be essentially invisible to the portable component, in order to intercept all attempts by the portable components to communicate with the external network before they are transmitted. The authorization interface can mimic a transport layer.

A step (410) may include generating a characteristic of the portable component. The characteristic can include a hash of an executable of the portable component. The characteristic can include a hash of one or more libraries associated with the portable component (e.g., libraries on disk). In some embodiments, the authorization interface generates the characteristic responsive to a trigger event, such as receiving an indication of the portable component requesting access to at least one of a new portable component, port, or interface that the portable component requesting access does not have access to. In some embodiments, the authorization interface generates the characteristic of the portable component at load time by hashing a non-volatile image of the portable component. For example, the authorization interface can hash a static image of the portable component on hard disk storage. In some embodiments, the authorization interface generates the characteristic of the portable component at run time by hashing an image and/or instance of the portable component in a dynamic memory space, which can be useful as a compromised portable component can affect the data stored in memory at run-time.

A step (415) may include using an authorizer (e.g., authorization service) to compare the characteristic to a predetermined characteristic. The authorizer can maintain a database mapping, to each portable component, at least one predetermined characteristic. For example, the database can include, for each portable component, a known hash of the portable component. The known hash may be received by the database from a trusted source, such as an independent authorization service. The database can include a known hash of each library associated with each corresponding portable component. The database can be a whitelist database. A step (420) may include determining whether the characteristic matches the predetermined characteristic based on the comparison (e.g., the result of executing a cryptographic hashing function to hash the portable component is equal to the known hash).

A step (425) may include denying the network connection request responsive to the characteristic not matching the predetermined characteristic. For example, a network interface may receive the network connection request along with an indication that the characteristic did not match the predetermined characteristic, and deny the network connection request accordingly. The network interface can isolate the network connection request and/or the portable component that originated the network connection request.

A step (430) may include generating an authentication token, by the authorizer, responsive to the characteristic matching the predetermined characteristic. A step (435) may include using the authorization token to authenticate the network connection request, such as by cryptographically signing the network connection request.

A step (440) may include transmitting a first notification to the authorization interface (from the authorizer) to indicate that the characteristic matched the predetermined characteristic. As such, the authorizer can inform the authorization service that the network connection request is authorized for transmission to the external network so that the portable component can communicate with the external network. The first notification may include the authentication token and/or the authenticated network connection request.

A step (445) may include receiving the network connection request at the network interface from the authorization service. For example, the authorization service can transmit the network connection request—having now been approved by the authorizer—to the network interface in response to receiving the first notification from the authorizer.

A step (450) may include receiving, at the network interface, a second notification that the network connection request is authorized. The authorizer can generate and transmit the second notification to indicate that the authorizer authenticated the network connection request for transmission to the external network.

A step (455) may include determining, by the network interface, whether the network connection request is authorized for transmission to the external network. The network interface can maintain an authorization database that assigns, to each of the portable components, an indication of whether the second notification has been received for the corresponding portable component to indicate that the network connection request originating from the portable component is approved for transmission via the external network. In some embodiments, the network interface can set each indication to an authorized state or a non-authorized state. The network interface can extract an identifier of the approved request from the approved request and use the extracted identifier to search the authorization database to retrieve the indication corresponding to the approved request and/or the portable component that originated the approved request. The network interface can use the retrieved indication to determine whether to transmit the request.

A step (460) may include transmit the approved request to the external network responsive to determining that the request is approved for transmission (e.g., based on determining the retrieved indication to be set to the authorized state). If the network interface determines that the network connection request is not approved for transmission to the external network, then the network connection request can be denied (425).

As will be appreciated from the above, systems and methods of hardened proxy authentication in accordance with the inventive concepts disclosed herein can enable open systems architectures used in mission critical systems, such as FACE and OMS, to be open to untrusted third party applications while preventing the third party applications from exfiltrating sensitive data if compromised. The systems and methods described herein can automatically inspect and, if needed, isolate network connection requests from the third party applications without requiring deep inspect of design details or significant increases in client delay and/or network overhead. The systems and methods described herein can enable whitelisting to be executed at the network port, rather than whitelisting the application itself, which reduce the need to prevent execution of safety critical applications.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A network authorization system, comprising:
   an authorization interface configured to:
      receive, from a portable avionics component, a network connection request to access an external network; and
      generate a characteristic of the portable avionics component;
   an authorizer coupled to the authorization interface, the authorizer configured to:
      receive the network connection request and the characteristic from the authorization interface;
      compare the characteristic to a predetermined characteristic corresponding to the portable avionics component;
      generate an authorization token responsive to the characteristic matching the predetermined characteristic based on the comparison;
      use the authorization token to authenticate the network connection request; and
      transmit a first notification to the authorization interface indicating that the characteristic matched the predetermined characteristic; and
   a network interface coupled to the authorization interface, the authorizer, and the external network, the network interface configured to:
      receive, from the authorization interface, the network connection request, the authorization interface transmitting the network connection request to the network interface responsive to receiving the first notification;
      receive, from the authorizer, a second notification indicating that the authorizer authenticated the network connection request; and
      transmit the network connection request to the external network responsive to determining, based on the network connection request and the second notification, that the network connection request is authorized for external transmission, wherein the portable avionics component is a source component, and the network interface determines that the network connection request is authorized for external transmission by:
         maintaining a database assigning, to each of a plurality of portable avionics components including the source component, an indication of whether the second notification has been received for the corresponding portable avionics component;
         searching the database to retrieve the indication corresponding to the source component; and
         determining that the network connection request is authorized for external transmission based on the retrieved indication.

2. The network authorization system of claim 1, comprising:
   a hypervisor configured to isolate the authorization interface, the authorizer, and the network interface.

3. The network authorization system of claim 1, wherein:
the authorization interface generates the characteristic of the portable component to include a hash of the portable avionics component.

4. The network authorization system of claim 3, wherein:
the authorization interface generates the characteristic of the portable avionics component to include a hash of at least one library associated with the portable avionics component.

5. The network authorization system of claim 3, wherein:
the authorization interface generates the characteristic of the portable avionics component at load time based on a non-volatile image of the portable avionics component.

6. The network authorization system of claim 3, wherein:
the authorization interface generates the characteristic of the portable avionics component based on a dynamic memory space instance of the portable avionics component.

7. The network authorization system of claim 1, wherein:
the network interface isolates the portable avionics component responsive to receiving the network connection request and determining the network connection request to not be authorized for external transmission.

8. The network authorization system of claim 1, wherein:
the network interface determines that the network connection request is authorized for external transmission based on the authorization token.

9. The network authorization system of claim 1, comprising:
a remote administration interface configured to output status information based on data received from the network interface, the status information including at least one of a recent application query, a connected client, or a usage detail.

10. An airborne platform, comprising:
a communications circuit configured to communicate with an external network;
a user interface including a display device and a user input device; and
an avionics system coupled to the communications circuit and the user interface, the avionics system including:
  an authorization interface configured to:
    receive, from a portable avionics component, a network connection request to access the external network; and
    generate a characteristic of the portable avionics component;
  an authorizer coupled to the authorization interface, the authorizer configured to:
    receive the network connection request and the characteristic from the authorization interface;
    compare the characteristic to a predetermined characteristic corresponding to the portable avionics component;
    generate an authorization token responsive to the characteristic matching the predetermined characteristic based on the comparison;
    use the authorization token to authenticate the network connection request; and
    transmit a first notification to the authorization interface indicating that the characteristic matched the predetermined characteristic; and
  a network interface coupled to the authorization interface, the authorizer, and the external network, the network interface configured to:
    receive, from the authorization interface, the network connection request, the authorization interface transmitting the network connection request to the network interface responsive to receiving the first notification;
    receive, from the authorizer, a second notification indicating that the authorizer authenticated the network connection request; and
    transmit the network connection request to the external network responsive to determining, based on the network connection request and the second notification, that the network connection request is authorized for external transmission, wherein the portable avionics component is a source component, and the network interface determines that the network connection request is authorized for external transmission by:
      maintaining a database assigning, to each of a plurality of portable avionics components including the source component, an indication of whether the second notification has been received for the corresponding portable avionics component;
      searching the database to retrieve the indication corresponding to the source component; and
      determining that the network connection request is authorized for external transmission based on the retrieved indication.

11. The airborne platform of claim 10, comprising:
one or more sensors that generate sensor data that the portable avionics component uses to generate display data for presentation by the display device.

12. The airborne platform of claim 10, comprising:
the display device presents a remote administration interface configured to output status information including at least one of a recent application query, a connected client, or a usage detail.

13. The airborne platform of claim 10, comprising:
a hypervisor configured to isolate the authorization interface, the authorizer, and the network interface.

14. A method, comprising:
receiving, by an authorization interface from a portable component, a network connection request to access an external network;
generating, by the authorization interface, a characteristic of the portable component;
receiving, by an authorizer, the network connection request and the characteristic from the authorization interface;
comparing, by the authorizer, the characteristic to a predetermined characteristic corresponding to the portable component;
generating, by the authorizer, an authorization token responsive to the characteristic matching the predetermined characteristic based on the comparison;
authenticating, by the authorizer, the network connection request using the authorization token;
transmitting, by the authorizer, a first notification to the authorization interface indicating that the characteristic matched the predetermined characteristic;
receiving, by a network interface from the authorization interface, the network connection request, the authorization interface transmitting the network connection request to the network interface responsive to receiving the first notification;
receiving, by the network interface from the authorizer, a second notification indicating that the authorizer authenticated the network connection request; and transmitting, by the network interface, the network connection request to the external network responsive to determining, based on the network connection request and the second notification, that the network connection request is authorized for external transmission, wherein the portable avionics component is a source component, and the network interface determines that the network connection request is authorized for external transmission by:

maintaining a database assigning, to each of a plurality of portable avionics components including the source component, an indication of whether the second notification has been received for the corresponding portable avionics component;

searching the database to retrieve the indication corresponding to the source component; and     determining that the network connection request is authorized for external transmission based on the retrieved indication.

15. The method of claim 14, comprising:

isolating, by a hypervisor, the authorization interface from the authorizer and the network interface.

16. The method of claim 14, comprising:

generating, by the authorization interface, the characteristic of the portable component to include a hash of the portable component.

17. The method of claim 14, comprising:

generating, by the authorization interface, the characteristic of the portable component to include a hash of at least one library associated with the portable component.

18. The method of claim 14, comprising:

isolating, by the network interface, the portable component responsive to receiving the network connection request and determining the network connection request to not be authorized for external transmission.

19. The method of claim 14, comprising:

outputting, by a remote administration interface, status information including at least one of a recent application query, a connected client, or a usage detail.

\* \* \* \* \*